Oct. 12, 1954     C. W. LINCOLN ET AL     2,691,704
DIRECTION SIGNAL SWITCH

Filed Feb. 15, 1950                               3 Sheets-Sheet 1

Inventors
Clovis W. Lincoln,
Philip B. Ziegler &
Henry D. Spiekerman
By Willits, Helwig & Baillio
Attorneys

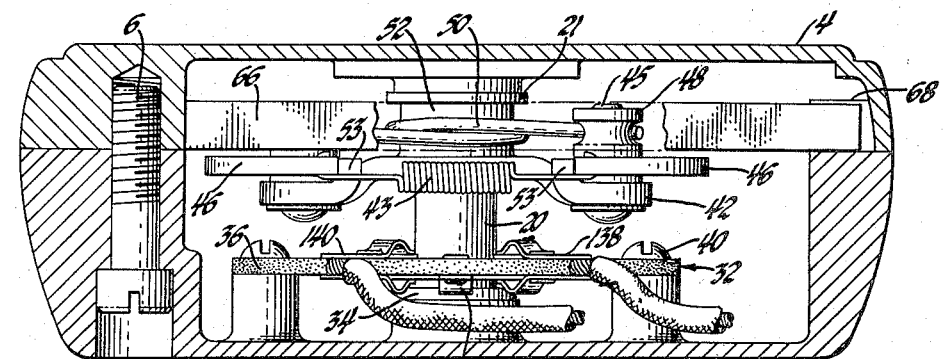
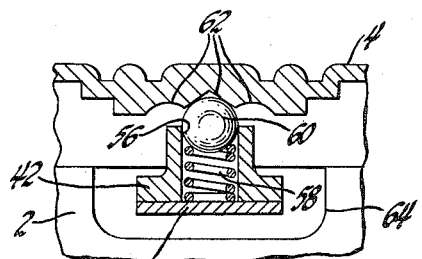
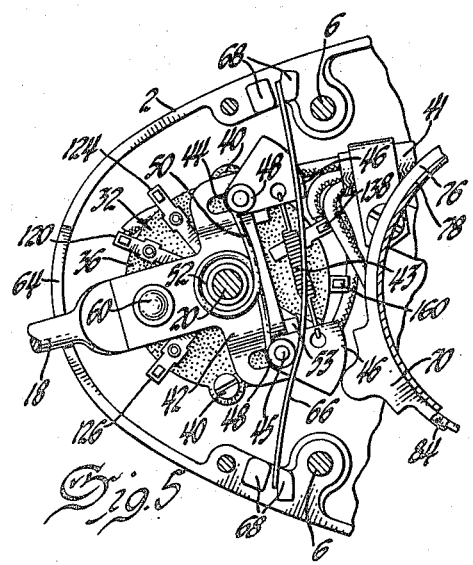
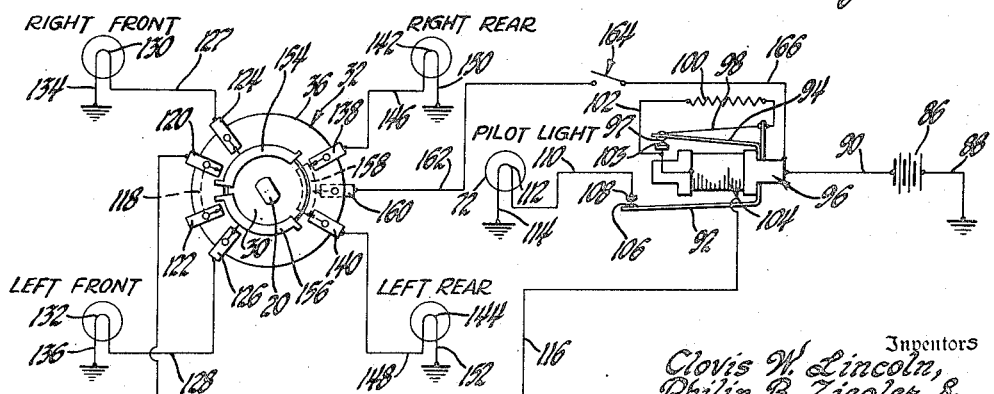

Oct. 12, 1954   C. W. LINCOLN ET AL   2,691,704
DIRECTION SIGNAL SWITCH

Filed Feb. 15, 1950   3 Sheets-Sheet 3

Inventors
Clovis W. Lincoln,
Philip B. Ziegler &
Henry D. Spiekerman

By Willits, Helwig & Baillio
Attorneys

Patented Oct. 12, 1954

2,691,704

UNITED STATES PATENT OFFICE 2,691,704

DIRECTION SIGNAL SWITCH

Clovis W. Lincoln, Philip B. Zeigler, and Henry D. Spiekerman, Saginaw, Mich., assignors to General Motors Corporation, Detroit, Mich., a corporation of Delaware Application February 15, 1950, Serial No. 144,304

15 Claims. (Cl. 200—61.34)

The present invention relates to direction signaling systems and more particularly to direction signaling devices for controlling such systems.

In vehicle direction signaling systems in which the setting of the signaling device is obtained by manual operation and resetting of the device is obtained by the operation of the steering mechanism, particularly the steering wheel, it has been found that the device frequently overtravels its neutral position because of the speed of rotation of the wheel and inertia of the mechanism of the signaling device as the wheel returns from a position for turning the vehicle to a position for a straight directional path of the vehicle. Such a condition of operation is undesirable as it requires the attention of the operator to reset the device manually. Moreover, with signaling devices dependent upon the rotation of the steering wheel of a vehicle for the resetting of the device, the lodging of a foreign object in the resetting mechanism frequently causes a locking or freezing of the steering mechanism which is dangerous and requires servicing before the vehicle is safe for driving.

Accordingly it is an object of the present invention to provide an improved direction signal device for such systems.

It is a further object to provide a direction signal device so constructed and arranged as to be substantially free of overtravel of the operating mechanism and locking or freezing of the steering mechanism.

This and other objects are attained in accordance with the present invention by providing a direction signal device having a mechanism including means for restraining or damping movement of the mechanism from its neutral position and resetting means capable of clearing any foreign object which might become lodged in the path of the mechanism to interfere with the operation of the steering mechanism.

Figure 1:
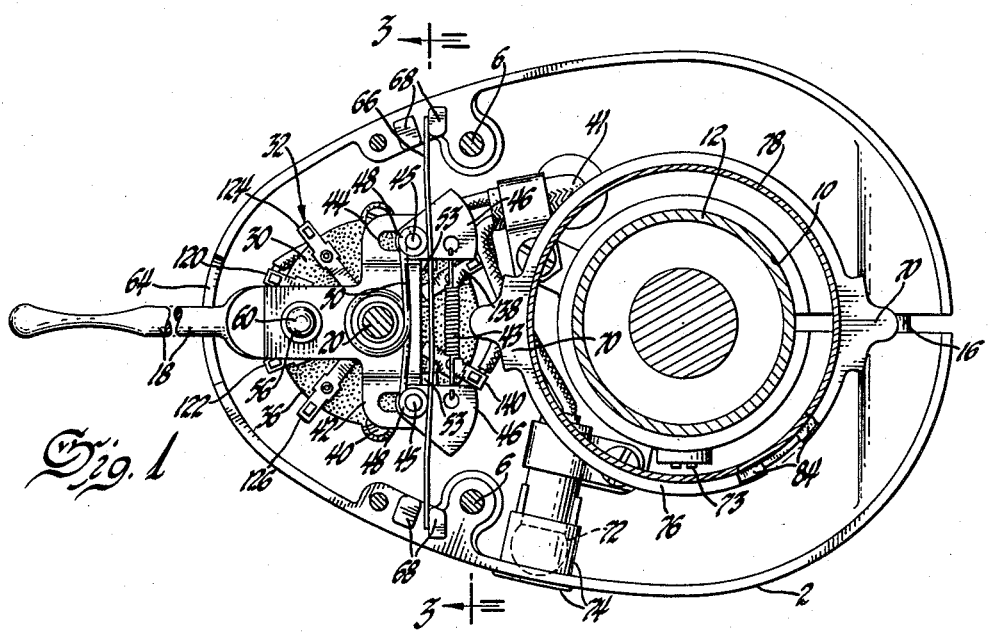
Figure 2:
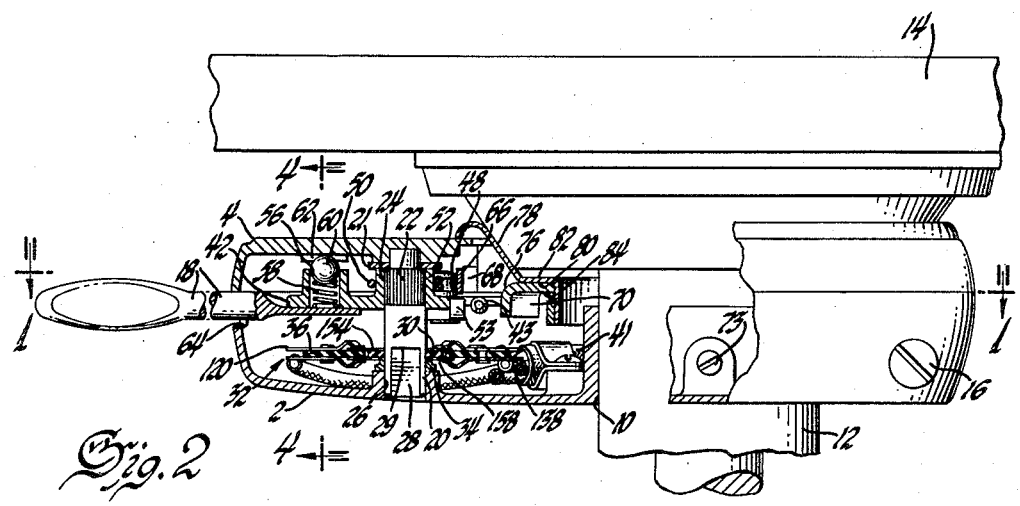
Figure 7:
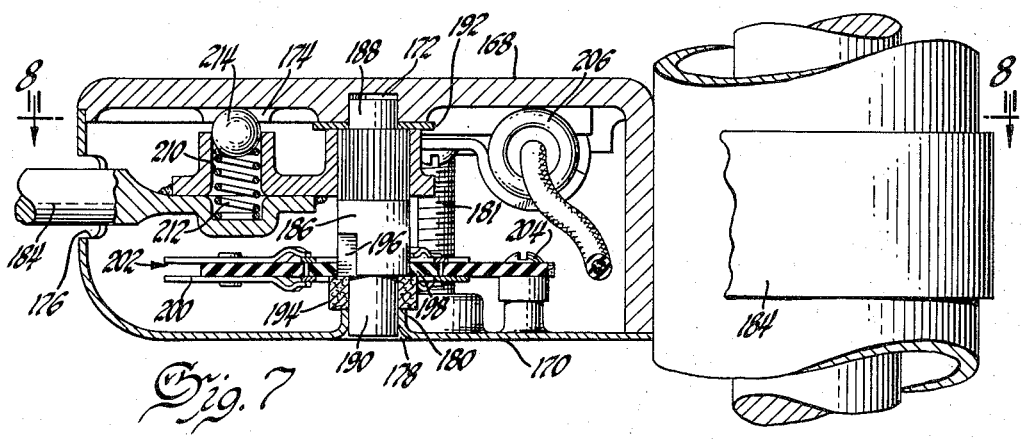
Figure 8:
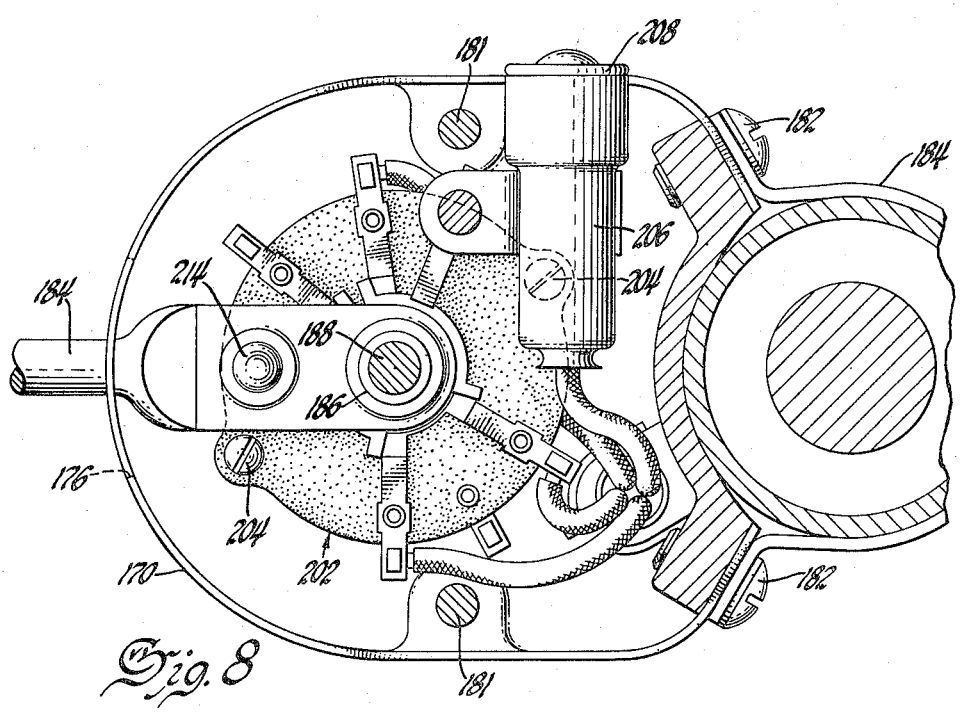

For a better understanding of the invention, reference may be had to the accompanying drawings in which Figure 1 is a plan view with parts in section and parts broken away taken on line 1—1 of Figure 2 and illustrating a turn signaling device embodying the present invention; Figure 2 is an elevational view of the device shown as being mounted on the steering column of a vehicle with parts broken away and parts in section; Figure 3 is an enlarged view taken on line 3—3 of Figure 1; Figure 4 is a fragmentary view taken on line 4—4 of Figure 2; Figure 5 is a fragmentary view similar to Figure 1 illustrating the device in one of its operating positions; Figure 6 is a schematic view of a direction signaling system and an electrical switch adapted to be controlled by the direction signaling device of our invention, and Figures 7 and 8 are views similar to Figures 1 and 2, illustrating a modification of our invention.

Referring now to the drawings and more particularly to Figures 1, 2, 3 and 5 there is illustrated a direction signaling device embodying the present invention having a housing comprising a body member 2 and a cover member 4 adapted to be secured to the body member by threaded screws 6. The body member 2 has formed integrally therewith a split ring clamp having an aperture 10 therethrough adapted to receive the steering column 12 of a vehicle and is secured to the steering column adjacent the steering wheel 14 of the vehicle by a clamping screw 16.

Positioned within the housing there is an operating lever 18 having secured at one end a pin 20, the ends of which are journaled respectively in the cover 4 and in the body member 2. To secure the pin 20 to the lever 18 the pin is provided with a knurled surface 22 adjacent the upper end which engages the side walls of an aperture 24 through the lever. The upper end of the pin 20 is provided with a reduced diameter adapting it to be recessed in the cover member 4 with a spacing washer 21 interposed between the lever and cover. The lower end of the pin 20 is recessed in an aperture 26 in the body member 2 and is formed with oppositely disposed flat surface portions 28 adapted to receive the rotor 30 of an electrical switch 32. To secure the pin 20 for rotation in the housing with the upper end recessed in the cover 4, the rotor 30 abuts shoulders 29 formed by the flat surface portions 28 and engages and rotates on a spacing bushing 34 interposed between the rotor and the body member 2. The rotor 30 is mounted on the pin 20 to rotate at the center of a terminal plate 36 secured to the body member by threaded screws 40 and carrying a plurality of finger contact terminals adapted to be attached to the terminal leads of a cable 41.

The operating lever 18 is provided with a cross member 42 which has formed adjacent its ends elongated slots 44. Secured for slidable movement in the slots are upwardly extending pins 45, each carrying a resetting dog 46 adapted to rotate on the pins. The dogs 46 are held in position on pins 45 by bushings 48 which are engaged by legs extending from a helical portion of a spring 50 secured on a hub 52 extending upwardly from the lever 18. The resetting dogs 46 are yieldingly urged against stops 53 extending upwardly from the cross member 42 by a spring 43. The operating lever 18 extends outwardly of the housing through an elongated aperture 64 in the body member 2 and is provided with a recess 56 adapted to receive a spring 58 and a ball member 60 which is yieldingly urged by the spring into engagement with a wall surface in the cover member 4 having a plurality of indexing grooves 62 as illustrated in Figure 4.

To provide means for yieldingly urging the operating lever 18 to a neutral position of operation for the direction signaling device and dampen the overtravel of the operating lever during its return to a neutral position from an operating position, a bar spring 66 is positioned within the housing with its ends secured between posts 68 projecting upwardly from the body member 2. With the bar spring 66 positioned as illustrated in Figure 1, it is in normal engagement with the bushings 48 and a clockwise or counterclockwise rotation of the operating lever 18 consequently causes the bar spring 66 to yield as illustrated in Figure 5. To obtain a yielding of spring 66 without a simultaneous yielding of the legs of spring 50 and consequent shifting of pins 45 in the slots 44, spring 50 is provided with a spring pressure greater than that of spring 66. Consequently, the pins 45 carrying the resetting dogs 46 shift in the slots 44 when an object becomes wedged in the path of one of the resetting dogs and resetting ears 70 or when the operator maintains the lever in an operative position manually as will be described in more detail hereinafter. In returning the operating lever 18 to its neutral or normal position in response to the operation of the resetting ears 70, the resetting ears may move at a rate of speed which will provide sufficient inertia forces to the operating lever to induce it to travel beyond its neutral position. With the spring bar 66 positioned as described it will provide a damping action against the overtravel of the operating lever 18.

To provide a signal indication that the lever is in one of its operating positions a pilot lamp 72 is secured within the housing adjacent a colored window 74 secured in the wall of the body member 2. A suitable electrical path to ground is provided for the pilot lamp 72 by a threaded screw 73 threadedly recessed in the body 2 and adapted to bite into the metal of the steering column 12.

To reset the lever 18 to its neutral position in response to the rotation of the steering wheel 14 of the vehicle, the diametrically opposed resetting ears 70 are formed on an annular ring 76 which is slidably mounted on a generally conically shaped ring 78 adapted to be attached to the hub of the steering wheel 14. The annular ring 76 is positioned on the ring 78 with one of its surfaces 80 in frictional engagement with the surface 82 of member 78. To provide for the frictional engagement of the surfaces 80 and 82 a washer 84 which may be of the Belleville washer type is secured on the member 78 by any suitable means and yieldingly urges the surface 80 of ring 76 into engagement with the surface 82 of member 78 as illustrated in Figure 2.

In operation, the operating lever may be moved in a clockwise or counterclockwise direction. As shown in Figure 5, movement of the lever in a counterclockwise direction to the limit of its travel as determined by the aperture 64 causes one of the resetting dogs 46 to be moved into the path of the resetting ears 70. With the lever in its operating position, as shown, the steering wheel 14 may be rotated in a counterclockwise direction until one of the ears 70 engages the inner edge and corner of the resetting ear moved into its path by the counterclockwise movement of the lever. Continued counterclockwise rotation of the steering wheel causes the resetting dog to rotate in a clockwise direction on the pin 45 and against the pressure of spring 43 until the dog is clear of the path of the resetting ears. Upon reversal of the direction of rotation of the wheel 14, one of the ears engages the arcuate camming surface of the dog and a component of force acting through the dog and pin applies a clockwise force to lever 18 about pin 20 which returns the lever to its neutral position. Likewise, a movement of the operating lever 18 in a clockwise direction to its other operating position will place the other resetting dog 46 in the path of the resetting ears 70 and a resetting action will occur substantially the same as hereinabove described in connection with the clockwise movement of the lever 18. Should a foreign object become lodged in the housing in such a manner as to be placed in the path of the resetting dogs 46 and the resetting ears 70 the provision of the elongated slots 44 permits the movement of the resetting dogs 46 against the pressure of spring 50 to a position in the elongated slots which will clear the foreign object and permit the resetting ear 70 to rotate without locking the steering mechanism of the vehicle. Further, the slots 44 perform an additional useful function in that they permit the dogs 46 to clear the resetting ears 70 when the switch handle is maintained in an operative position by the operator. If, for example, the operating lever 18 is moved to indicate a left turn, as illustrated in Figure 5, and held in this position while the steering wheel is rotating clockwise in its normal resetting movement the resetting ears 70 will apply pressure to the dog 46 in their path and cause it and the pin 45 to slide back in the slot 44 out of the path of travel thus preventing any damage to the mechanism. Likewise as an added safety precaution against the freezing or locking of the steering mechanism the ring member 76 being in frictional engagement with the member 78 permits relative movement between the two members without the freezing of the steering wheel mechanism.

To index the operating lever 18 in either of its operating or neutral positions the indexing grooves 62 are provided in the inner wall of the cover member 4 as illustrated in Figure 4. The grooves 62 are adapted to receive the yieldingly urged ball 60 which provides a restraining action against movement of the lever from any one of the three positions.

A turn signal device such as we have hereinabove described is particularly adapted for operation in a direction signaling system such as that schematically illustrated in Figure 6 of the drawings. In the system illustrated in Figure 6, a battery 86 has one terminal connected to ground by conductor 88 and the other terminal connected by a conductor 90 to the armatures 92 and 94 of a current interrupting device 96 such as those commonly used at the present time in direction signal systems. The armature 94 carries a contact member 97 which is connected through a hot wire 98 and resistor 100 to a fixed contact 103 and the solenoid coil 104. The armature 92 carries a contact 106 adapted to engage a fixed contact 108 connected through conductor 110, filament 112 of the pilot lamp 72 and conductor 114 to ground. The solenoid coil 104 of the current interrupting device 96 is connected by a conductor 116 and a jumper strap 118 to contact terminals 120 and 122 attached to the terminal plate 36 of the switch 32 as shown. Spaced from the contact terminals 120 and 122 are the contact terminals 124 and 126 which are connected respectively to ground through conductors 127 and 128, filaments 130 and 132 and conductors 134 and 136. Also mounted on the terminal plate 36 are the contact terminals 138 and 140 which are connected respectively to the filaments 142 and 144 of the right and left rear lamps by the conductors 146 and 148. The other terminals of filaments 142 and 144 are connected to ground through the conductors 150 and 152. To provide for bridging the plurality of contact terminals the rotor 30 of the switch 32 carries the current carrying members 154, 156 and 158. As illustrated schematically in Figure 6, the current carrying member 158 is in contact with the contact terminal members 138 and 140 and is likewise connected through contact terminal 160 and conductor 162 to one terminal of a brake operated switch 164. The other terminal of the switch 164 is connected through conductors 166 and 90 to the battery.

In the operation of the direction signaling system a counterclockwise rotation of the lever 18 causes the rotor 30 of the switch 32 to rotate counterclockwise with the current carrying member 156 providing a bridging of the contact terminals 122, 126 and 140. A signaling circuit is then provided to the left front and rear signaling lamps from the battery 86 through conductor 90, armature 94, hot wire 98, resistor 100, conductor 102, solenoid coil 104 and conductor 116. With current passing through this circuit, the hot wire 98 expands causing an engagement of contacts 97 and 103 to bypass resistor 100. This provides for the flashing of the filaments of the left front and rear signaling lamps. At the same time, the armature 92 with its contact 106 is caused by the magnetic force of the solenoid coil 104 to engage contact terminal 108 energizing the pilot light 72 to provide a visual signal for the operator indicating a flashing of the left front and rear signaling lamps. With the bypassing of the hot wire 98 and the resistor 100 the hot wire 98 is cooled causing the contacts 97 and 103 to open and placing the resistor back in circuit from the battery to the left front and left rear signal lamps. With the left front and rear signaling lamp circuits energized the operator may indicate a stop by depressing the brake pedal thus closing the brake operated switch 164 to energize a circuit from the battery 86 through conductors 90, 166, 162, contact terminal 160, current carrying member 158, contact terminal 138 and conductor 146 to the filament 142 of the right rear signaling lamp. With the brake operated switch closed, the right rear signaling lamp is energized with a steady current flow thereby providing a steady light signal at the right rear of the vehicle and an intermittent light signal at the left rear of the vehicle. A return of the operating lever 18 to its neutral position will cause an unbridging of the circuit from the battery to the left front and rear signaling lamps and a bridging by the current carrying member 158 of the contact terminals 138 and 140 connected respectively to conductors 146 and 148. Consequently, with the switch 32 in its neutral position, operation of the brake switch will close a circuit from the battery through conductors 90, 166, 162, contact terminal 160, current carrying member 158, contact terminals 138 and 140 and conductors 146 and 148 to the filaments of the right and left rear lamps. It will be apparent that with a clockwise movement of lever 18 a similar switching arrangement will be provided to intermittently energize the filaments 130 and 142 of the right front and rear signaling lamps.

In Figures 7 and 8 of the drawings we have illustrated a modification of our invention which is substantially similar to the direction signal device of Figures 1 through 5 inclusive except that there is no resetting mechanism provided. In this modification the housing comprises the body member 168 and the cover member 170. The body member is preferably a die casting having the recess 172 and a plurality of indexing grooves 174 similar to the indexing grooves illustrated in Figure 4. The cover member 170 is preferably a metal stamping provided with an elongated aperture 176 and the aperture 178 surrounded by the inwardly extending collar 180. The body and cover members 168 and 170 are secured together by the threaded screws 181 and 182 the latter also being adapted to secure the housing to the steering column of a vehicle by a clamping ring 184.

Positioned within the housing is an operating lever 185 having the pin 186 secured to and passing through one end of the lever. The pin 186 is provided with the reduced ends 188 and 190 adapted to be received in the recess 172 and aperture 178 respectively and is secured against lateral shifting in the housing by the spacing washers 192 and 194. Diametrically opposed flat portions 196 on the pin provide for securing a rotor 198 to rotate with the pin within a terminal plate 200 of an electrical switch 202 attached to the cover member by threaded screws 204. The rotor 198 is provided with the current carrying members adapted when the lever and rotor are in operative positions to engage contact terminals as described hereinbefore in connection with switch 32. To provide a visual signal to the operator of circuit energization, a pilot lamp 206 is secured to the body member adjacent a transparent window 208 in the housing wall.

To provide for indexing the operating lever in its neutral or operating positions the lever is formed with a recess 210 adapted to receive a spring 212 for yieldingly urging a ball 214 into the plurality of indexing grooves 174. In both of the direction signal devices of our invention the operating lever is illustrated as comprising two parts, the operating handle and the portion carrying the pin both of which are joined together as a unitary structure as by soldering or welding.

The operation of the modified device illustrated in Figures 7 and 8 is substantially the same as that of Figures 1 to 5 inclusive except that the resetting operation is manual instead of automatic.

While the embodiments of the present invention as herein disclosed constitute preferred forms, it is to be understood that other forms might be adopted, all coming within the scope of the claims which follow.

What we claim as new and desire to secure by Letters Patent of the United States is:

1. In a direction signaling device, a housing having a plurality of adjacent recesses in one wall and an aperture providing communication between the exterior and interior thereof, an operating lever having a laterally extending pin attached to one end thereof, said lever and pin being positioned in said housing, the pin ends journaled in the inner walls thereof and the lever extending outwardly through said aperture, a rotary switch comprising a terminal plate having a plurality of terminal contact members and a rotor having a plurality of current carrying members for engaging said contact members, said terminal plate being attached to said housing and said rotor being mounted on said pin and a detent member positioned in said lever and yieldingly urged outwardly for engagement with said recesses to provide for positioning said lever and rotor in a plurality of signaling positions.

2. In a direction signaling device, a housing having a plurality of adjacent recesses in an inner surface of an outer wall thereof and an elongated aperture providing communication between the interior and exterior thereof, an operating lever pivotally mounted in said housing and extending outwardly through said aperture, a pair of spaced dogs pivotally mounted on said lever and yieldingly urged into engagement with stops therebetween, said dogs being movable with said lever into the path of resetting means adapted to engage and rotate said dogs when moved in one direction and engage said dogs and cause rotation of said lever to a position in which the resetting means clears said dogs when moved in the opposite direction, an electrical switch connected to said lever and actuated thereby, and detent means recessed in said lever and yieldingly urged into said recesses to position said lever and switch in a plurality of signaling positions.

3. In a direction signaling device, a housing, an operating lever pivotally mounted in said housing, said lever having a pair of spaced elongated slots thereon, pins extending upwardly therefrom and slidably mounted in said slots, said pins being yieldingly urged to one end thereof, dogs pivotally mounted on said pins, stops attached to said lever between said dogs for engagement therewith, spring means yieldingly urging said dogs into engagement with said stops, said lever being movable to place one of said dogs in the path of resetting means adapted to engage and rotate said dogs out of the path of said resetting means when moved in one direction and engage said dogs to rotate said lever to a position where the dogs clear said resetting means when moved in the opposite direction, an electrical switch positioned in said housing and connected to said lever for actuation thereby and spring means attached to and extending across said housing for engaging both of said upwardly extending pins when said lever is in a neutral position and to engage one of said pins when said lever is in an operative position whereby said spring means yieldingly urges said lever to its neutral position.

4. In a direction signaling device, a housing having an elongated slot in one wall, a cover member adapted to enclose said housing, said cover member having a plurality of positioning grooves in its inner wall, an operating lever having a cross member with elongated slots adjacent the ends of said cross member, a pin secured in said operating member and extending laterally therethrough, said operating lever and pin being pivotally mounted in said housing and cover member and extending outwardly through said elongated slot, dogs pivotally mounted in said elongated slots and yieldingly urged to one end thereof, stops on said lever between said dogs, means yieldingly urging said dogs into engagement with said stops, spring means secured in said housing for yieldingly urging said operating lever to a neutral position, said lever being movable to a position to place one of said dogs in the path of a resetting means adapted when moved in one direction to engage and rotate said dog out of the path of said resetting means and when moved in the opposite direction to engage said dogs and move said dogs and said lever to a position clearing said resetting means, a rotary switch comprising a terminal plate provided with a plurality of contact terminal members and a rotating member provided with current carrying members, said terminal plate being secured to said housing and said rotating member being secured to said pin, a detent member recessed in said lever and yieldingly urged into engagement with one of said grooves for indexing the position of said operating lever.

5. In combination with a vehicle having a steering column and a steering wheel with resetting means including outwardly extending ears attached thereto, a direction signaling device having a housing with an elongated aperture providing communication between the interior and exterior thereof, a cover member adapted to enclose said housing, said cover member having a plurality of indexing grooves in its inner wall, an operating lever having a cross member with elongated slots adjacent the ends thereof, a pin secured in said operating member and extending laterally therethrough, said operating lever and pin being pivotally mounted in said housing and cover member and extending outwardly through said slot, a pair of dogs pivotally mounted in said elongated slots, stops between said dogs and on said lever, means yieldingly urging said dogs into engagement with said stops, said lever being movable to place one of said dogs in the path of said resetting means for rotation of said dog out of the path of said resetting means when said steering wheel is rotated in one direction and for engaging said resetting means and rotating said lever to a position clearing said dogs from the path of said resetting means when said steering wheel is moved in the opposite direction, spring means attached to said housing and yieldingly urging said operating lever to a position with said dogs out of the path of said resetting means, a rotary switch comprising a terminal plate provided with a plurality of contact terminals and a rotating member provided with current carrying members, said rotating member being secured to said pin and said terminal member being secured to said housing, and a detent member recessed in said lever and yieldingly urged into engagement with one of said indexing grooves for indexing the position of said operating lever.

6. In a direction signaling device, a housing, an operating member having a cross member with elongated slots adjacent the ends thereof, resetting means for said operating member, a pin secured in said operating member and extending laterally therethrough, said operating member and said pin being pivotally mounted in said housing, pivotal dogs mounted in said slots, yieldable means urging said dogs toward one end thereof, stop means on said cross member limiting pivotal movement of said dogs in one direction, spring means urging said dogs against said stops, said dogs being pivotally responsive to movement of said resetting means upon movement of said operating member, said yieldable means being responsive to abnormal pressure on said dogs to permit slidable movement of said dogs in said elongated slot, and a transversely extending plate spring adapted to center said operating member.

7. A switch operating mechanism movable from a switch open position to switch closing positions on either side of said switch open position, comprising, a lever, a switch operatively connected to said lever, handle means on said lever for actuating the latter to different positions of adjustment, automatic means for returning said lever and said switch to switch open position after adjustment thereof to switch closing position, said automatic means including bodily movable, pivotal dogs mounted on said lever, resilient means resisting pivotal movement of said dogs, and additional resilient means for resisting bodily movement of said dogs.

8. In a direction signaling device, a housing, an operating member movable to a plurality of adjusted positions, said member having oppositely extending legs provided with elongated slots adjacent the ends thereof, means for pivotally supporting said lever in said housing, rotatable resetting means for said operating member, dogs pivotally mounted in said elongated slots, said dogs being movable with said operating member into the path of said resetting means and adapted to rotate upon movement of said resetting means in one direction and to move said operating member upon movement of said resetting means in the opposite direction, said dogs being yieldably movable in said slots in response to movement of said resetting means in said opposite direction when movement of said operating member is obstructed, and an electrical switch mounted in said housing for actuation by said operating member.

9. In a direction signaling device, a housing, an operating member pivotally mounted in said housing, said operating member having a cross member with elongated slots adjacent the ends thereof and a transversely extending portion having a struck up tubular member formed thereon, dogs pivotally mounted in said elongated slots, detent means mounted in said tubular member, rotatable resetting means for said operating member, said dogs being movable into the path of said resetting member in response to movement of said operating member, spring means permitting yieldable rotation of each of said dogs in one direction only, means on said operating member yieldably urging said dogs toward one end of said slots, said last mentioned means being adapted to permit said resetting means to override said dogs when abnormal resistance is encountered by said operating member into a position withdrawing said dogs from engagement with said resetting means, and a switch mounted in said housing for actuation by said operating member.

10. In a direction signaling device, a housing having an elongated slot therein providing communication between the interior and exterior thereof, an operating lever mounted in said housing comprising a handle portion extending outwardly through said slot and a supporting portion, a pivotal member secured to said supporting portion and rotatably supported in said housing, an electrical switch positioned in said housing and connected to said supporting portion for actuation thereby, locating means in an inner surface of an outer wall of said housing, and a detent member mounted on said supporting portion and yieldably urged into engagement with said locating means.

11. In a direction signaling device, a housing having an elongated slot providing communication between the interior and exterior thereof, an operating lever mounted in said housing comprising a handle portion extending outwardly through said slot and a supporting member having a struck up annular portion formed thereon, a pivotal member secured to said supporting member and rotatably mounted in said housing, an electrical switch positioned in said housing and connected to said supporting member for actuation thereby, locating means in an inner surface of an outer wall of said housing, and a detent member disposed in said struck up annular portion on said supporting member and yieldingly urged into engagement with said locating means.

12. A switch operating mechanism comprising an operating member, a guide slot, resetting means for said operating member, a pivotal dog mounted in said guide slot, yieldable means urging said dog toward one end of said slot, and spring means resisting pivotal movement of said dog in one direction, said dog being pivotally responsive in the opposite direction to movement of said resetting means, said yieldable means being responsive to abnormal pressure on said dog to permit slidable movement thereof in said slot.

13. In a direction signaling device, a housing, an operating member, means forming guide slots, resetting means for said operating member, pivotal dogs mounted in said guide slots, stop means limiting pivotal movement of said dogs in one direction, spring means urging said dogs against said stops, said dogs being pivotally responsive in one direction to movement of said resetting means, and yieldable means urging said dogs toward one end of said slots, said yieldable means permitting bodily movement of said dogs in said slots when said operating member is manually restrained in an operating position.

14. A switch operating mechanism comprising a pivotally mounted operating lever, a switch operated by said lever to opened and closed position, rotatable resetting means for returning said lever to normal position after operation thereof to switch closing position, a pivotal dog shiftable by said lever into position for engagement by said resetting means to return said lever to normal position upon rotation of said resetting means in one direction and for actuation about its pivot upon rotation of said resetting means in the opposite direction, and yieldable means engaging said dog enabling bodily movement of said dog and pivot upon movement of said resetting means in said first mentioned direction when said operating lever is restrained again movement toward its normal position.

15. A switch operating mechanism comprising an operating member, a dog, a guide slot, a pivot for said dog movable in said guide slot, resetting means adapted to swing said dog on said pivot to enable said resetting means to clear said dog upon movement of said dog ear in one direction, said resetting means bodily moving said dog along said slot to clear said dog upon movement of said resetting means in the opposite direction whereby said lever may be restrained against movement out of switch operated position without damage to said parts.

(References on following page)

References Cited in the file of this patent

UNITED STATES PATENTS

| Number | Name | Date |
|---|---|---|
| 2,012,492 | Arnold | Aug. 27, 1935 |
| 2,070,454 | Rushing | Feb. 9, 1937 |
| 2,194,210 | Nesson | Mar. 19, 1940 |
| 2,205,664 | Mayer | June 25, 1940 |
| 2,226,082 | Thirlwell | Dec. 24, 1940 |
| 2,264,225 | Thirlwell | Nov. 25, 1941 |
| 2,284,936 | Wilshusen | June 2, 1942 |
| 2,288,207 | Quillery | June 30, 1942 |
| 2,405,005 | Anderson | July 30, 1946 |
| 2,418,616 | Batcheller | Apr. 8, 1947 |
| 2,427,595 | Fuller | Sept. 16, 1947 |
| 2,511,069 | Lawson | June 13, 1950 |
| 2,525,033 | Hollins | Oct. 10, 1950 |
| 2,596,834 | Barcus | May 13, 1952 |